United States Patent [19]
Mairlot

[11] Patent Number: 4,899,507
[45] Date of Patent: * Feb. 13, 1990

[54] CURVED GLAZED PANELS

[75] Inventor: Henri Mairlot, Acoz, Belgium

[73] Assignee: Glaceries De Saint - Roch S.A., Sambreville, Belgium

[ * ] Notice: The portion of the term of this patent subsequent to Jul. 18, 2006 has been disclaimed.

[21] Appl. No.: 160,318

[22] Filed: Feb. 25, 1988

[30] Foreign Application Priority Data

Feb. 27, 1987 [BE] Belgium ............................... 8700186

[51] Int. Cl.⁴ .............................................. E04C 2/30
[52] U.S. Cl. ....................................... 52/222; 52/475; 52/656; 52/823
[58] Field of Search .................... 52/86, 222, 823, 656, 52/475

[56] References Cited

U.S. PATENT DOCUMENTS

| | | |
|---|---|---|
| 1,992,976 | 3/1935 | Watkins . |
| 2,480,642 | 8/1949 | Galloway . |
| 2,816,632 | 12/1957 | Nardulli ................................ 52/823 |
| 3,784,043 | 1/1974 | Presnick ................................ 52/823 |
| 3,822,122 | 7/1974 | Plumat et al. . |
| 4,055,030 | 10/1977 | Earnshaw ............................. 52/222 |
| 4,205,486 | 6/1980 | Guarnacci . |
| 4,358,183 | 11/1982 | Whiteford ............................. 52/222 |
| 4,536,997 | 8/1985 | Heescher .............................. 52/222 |
| 4,622,797 | 11/1986 | Wüster ................................. 52/823 |
| 4,723,386 | 2/1988 | Sandow ................................ 52/86 |

FOREIGN PATENT DOCUMENTS

| | | |
|---|---|---|
| 0072382 | 2/1983 | European Pat. Off. . |
| 2313694 | 10/1974 | Fed. Rep. of Germany . |
| 0416179 | 10/1910 | France . |
| 1396414 | 3/1965 | France . |
| 2138711 | 5/1973 | France . |
| 7802842 | 9/1978 | Netherlands . |

Primary Examiner—Carl D. Friedman
Assistant Examiner—Caroline D. Dennison
Attorney, Agent, or Firm—Leonard Bloom

[57] ABSTRACT

A thermally-tempered, cold curved panel having a sheet of glass, including a resiliently-flexed curvature, and a frame which is adapted to maintain the curvature of the sheet of glass under constraint, as well as a method and a device for producing the curved panel, is disclosed. The frame of the panel includes straight frame sections and curved frame sections which are secured to the sheet of glass, retaining the curvature of the sheet of glass under constraint. The sheet of glass is thermally-tempered being cold-curved at a temperature being between 80° C. and 140° C., such that a resiliently-flexed curvature is formed therein. The curvature is maintained under constraint by a special device while the frame is assembled about the edges of the glass. Once assembled, the frame maintains the curvature of the thermally-tempered sheet of glass under constraint. The device which permits curving is a template having an upper curving surface having substantially the same curvature as that desired for the final product. Suction discs, carried by jacks are secured to parts of the glass not contacting the curving surface. Movement of the jacks with the suction discs carried thereon provide the force for the curving operation.

27 Claims, 5 Drawing Sheets

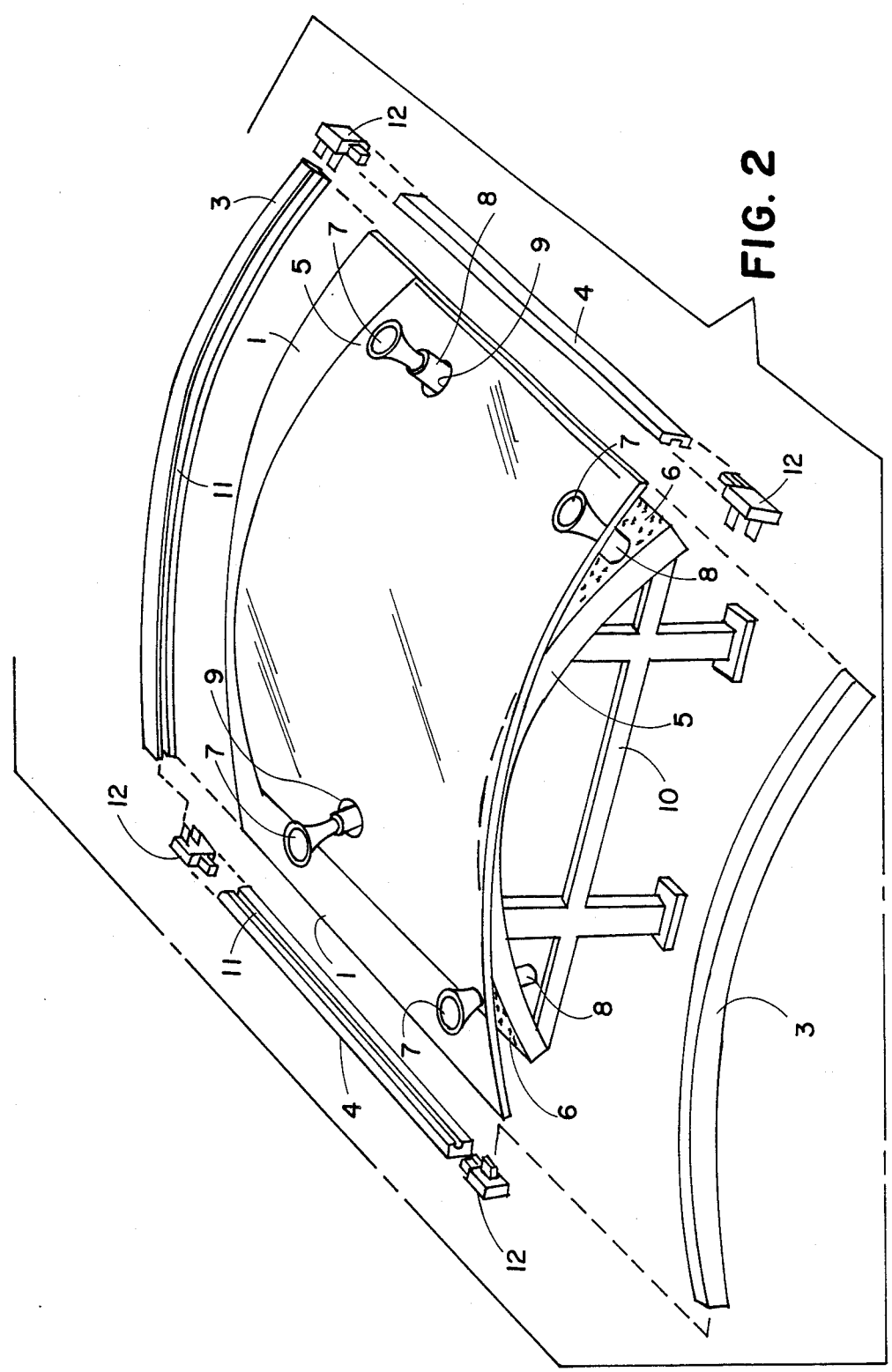

CURVED GLAZED PANELS

CROSS-REFERENCE TO RELATED APPLICATION

The present application is related to co-pending application for "CURVED GLAZED ROOFS," filed Feb. 25, 1988, and identified as Ser. No. 160,319, now U.S. Pat. No. 4,848,048.

FIELD OF THE INVENTION

The present invention concerns self-supporting curved glazed panels particularly usable for the construction of roofs or walls and, more particularly, for the construction of greenhouses, glass roofs, canopies and transparent enclosures, and a method and a device for the fabrication thereof.

BACKGROUND OF THE INVENTION

It has long been desired to provide materials for transparent covers which have a low cost per unit, exhibit good luminosity, provide a good security of employment, have durable qualities and which have a good facility of placement.

The use of glass is preferred, over plastic materials, due to its advantages of inalterability and of very large transparence. Unfortunately, glass is badly served by its fragility and thinness.

For obviating this inconvenience, one is able to increase the thickness of the glass. However, this results in a reduction of the transmission of light therethrough, an increase in the price and weight thereof, and, therefore, similar increases relative to the structures of support.

One can equally reduce the volume of the surface of the sheet of glass, However, that involves an increase in bulk of the frame structures and a loss of luminosity. Above all this, such a reduction complicates use of the panels by requiring many more manipulations thereof during construction therewith.

Another solution is to resort to the large surfaces of glass which have been cambered when hot, for benefiting from a better mechanical rigidity. However, the production of hot-cambered glass is very expensive.

Hot-cambered glass is formed from panels of planar glass. The glass is heated near its softening point for performing the operation of placing the glass in the cambered form. This operation is costly in energy. The panels of cambered glass must then be worked and transported in this form, which utilizes excess transportation and storage costs and which greatly increases the risks of breakage.

It is known that a treatment of tempering (thermal or chemical) of glass establishes: on one part, tensions (forces) of permanent compression in the external layers thereof, which has for result a superior resistance to rupture by flexing; and, on the other part, tensions (forces) of pulling the internal layers of the piece of glass, which in case of breakage, results in the piece of glass dividing itself in a large number of fragments, thereby reducing the risks of injury therefrom by laceration.

Sheets of chemically-tempered glass (by a treatment of the diffusion of ions) presents good characteristics of fragmentation (as described above) in case of rupture. Unfortunately, however, sheets of chemically-tempered glass do not present a sufficient resistance to rupture under the effect of the shock of small hard objects which nick the surface of the glass, resulting in penetration. This is due, at least in part, to the fact that the thickness of the layer of glass that is in compression (in the surface of the chemically-tempered glass) is not more than in the order of 50 $\mu$m. This defect of chemically-tempered glass is particularly important in cases wherein the sheets of glass have a large area, such as the windshields of automobiles.

French Pat. No. 2,138,711 proposes to remedy this inconvenience of chemically tempered glass by maintaining a sheet of glass in such a way that the tensions (forces) of compression is existent in one of the sides. This side, which is placed in compression, is then utilized as the "exterior face" of the realized article, that is to say, the face of the sheet of glass which is exposed to the elements and other hazards, such as the projections of small hard objects (for example, the exterior face of the windshield of an automobile).

Unfortunately, the technique described in French Pat. No. 2,138,711 exclusively concerns chemically-tempered glass. This technique does not permit, by elastic flexing of a sheet of thermally-tempered planar glass, obtaining a sheet of curved glass whose convex surface is resistant to the impact of small hard objects. Thus, the technique disclosed in French Pat. No. 2,138,711 is not applicable to sheets of glass which have been thermally-tempered in a planar form.

Contrary to chemical-tempering, thermal-tempering involves a thermal modification of the glass which strengthens it throughout its width. This means that its impact resistant qualities are not only found in the surface layers of the glass. Accordingly, even an impact which nicks the surface of the sheet of thermally-tempered glass will not necessarily result in the breakage thereof. Thus, thermally-tempered glass exhibits a superior constraint of rupture over chemically-tempered glass, which increases in function corresponding to its degree of tempering and which is able to withstand constraints of rupture in the order of 200 N/M$^2$ or more. Elastic-flexing of this thermally-tempered sheet of glass further increases the mechanical strength thereof due to the creation of the forces of compression and pulling described above.

Thus, it can be seen that the goals and use of applications of the present invention is fundamentally different from those of the technique described in French Pat. No. 2,138,711.

Accordingly, it can be seen that there remains a need to realize panels of thermally-tempered glass which benefit from the ease of fabrication and transportation enjoyed by flat sheets of glass (thereby reducing the cost per unit thereof), which can be resiliently-flexed, has a surface extended in relation to its perimeter of framing (thereby providing greater luminosity) and which presents a good security of employment.

SUMMARY OF THE INVENTION

The first object of the invention is to economically realize panels of light glass, of large dimensions and which have good mechanical resistance.

The invention has equally for an object to assure a simple and economic process and device for the production of these panels.

Another object of the invention is to realize an element of curved construction which is transparent, easy to manipulate and easy to construct.

In accordance with the teachings of the present invention, there is disclosed, a curved glazed panel. This panel includes a sheet of thermally-tempered glass, originally planar, which is curved (resiliently-flexed) when cold (cold-curved) and a curved frame which is adapted to maintain the resiliently-flexed curvature, under constraint, of the said sheet of glass. This frame is formed by assembling a pair of parallel straight frame sections which are disposed along the straight edges of the sheet of glass and curved frame sections which are disposed along the curved edges of the sheet of glass. The edges of the sheet of glass are inserted into and are received and retained in a longitudinal slot arranged about the internal face of the frame, forming a curved glazed panel.

Preferably, the sections are joined at their extremes (opposite ends) by angle pieces (corner frame sections). Each of these corner frame sections are equipped having a pair of longitudinal slots. Each of the slots on each respective corner frame section is perpendicular to the other of said slots of said corner frame section, and is further aligned with, and corresponding to, a slot formed in the adjacent straight or curved frame section. Finally, each of the corner frame sections is adapted with means to assemble (secure) two sections of the frame so that said frame sections are disposed at a substantially right angle relation to one another.

Of advantageous manner, in the embodiment described above, the corner frame sections have, on a one and a second portion thereof, a pair of anchoring tongues. Each tongue is formed on one of the one or second portions of a corner frame section, extending following the axis of the sections constituting the frame. These anchoring tongues cooperate with channels formed in the opposite ends of both the curved and straight frame sections extending following the longitudinal axis of these frame sections.

By "curved when cold" and "cold-curved" what is meant is a curving which is carried out on the planar glass at a temperature which is clearly less than the temperature at which the glass softens. In practice, the operation of curving (resilient-flexing) will be performed at a temperature less than 140° C. In most cases (when one uses a "simple" thermally tempered sheet of glass, that is to say, a sheet of glass which is not laminated), this operation will be performed at ambient temperature.

In a particular embodiment, the sheet of glass which comprises the panel is composed of laminated glass. This sheet of originally planar laminated glass undergoes, before being curved, heating to a temperature sufficient for provoking a softening of the plastic-like material therebetween.

In another particular embodiment, the frame sections of the curved frame are comprised of a first frame element having, formed along its internal face, a longitudinal rabbet which is adapted to receive the edges of the sheet of glass, and of a second frame element which is assembled (secured) to the first frame element over both the rabbet and the edge of the said sheet of glass positioned therein, forming therefore the longitudinal slot in which is inserted (received) the edges of the sheet of glass.

According to an advantageous embodiment of the invention, the frame of the panel is formed from sections which are hollow being substantially rectangular in cross-section. The longest side (lateral side wall) of each of the sections is disposed perpendicularly to the surface of the sheet of glass. The longitudinal slot maintains itself open on the exterior face of the lateral side of the frame section which is disposed towards the interior of the frame.

Following an advantageous embodiment, each of the frame sections of the panel following the invention include, on at least one of their small sides (interior or exterior sides), an inverted T-slot. Corresponding inverted T-slots are arranged perpendicularly on the corner frame sections, where they cross one another at a right angle.

Following another embodiment of the present invention, the frame sections of the panel are formed from hollow sections being substantially rectangular in shape. The longest side (the lateral side wall) of each of the sections is disposed perpendicularly to the surface of the sheet of glass. The longitudinal slot maintains itself open on the exterior face (lateral side) of the side of the frame section which is disposed towards the interior of the frame. This same lateral side wall, oriented towards the interior of the frame presents, on the interior face thereof, at least two pairs of ribs. Each pair of ribs forms a small split cylindrical longitudinal tubular sheath. These frame sections are assembled between them, at their extremities, by the tapped screws (threaded bolts). Each threaded bolt traverses through a tapped aperture formed in one of the said sections in the proximity of its extremity and engages itself in one of the small split tubular sheaths of the other section securing these frame sections to one another in an abutting arrangement. These frame sections comprise advantageously, on at least one of their small (exterior or interior) sides, an inverse T-slot.

Advantageously, at least one ribbon of flexible material or glue is disposed along the frame in the slot in the zone of contact between the frame and the sheet of glass.

Following an optional embodiment, a supplemental straight frame section connects the curved frame sections of the frame of the panel in following the concave face of the sheet of glass, parallel to the straight frame sections.

In another embodiment of the invention, the frame sections include, on one of their small sides (one of their exterior or interior sides), clips (anchoring clips) of a form adapted to cooperate by fitting into the inverted T-slots of the frame sections of another curved glazed panel of corresponding dimensions, enabling therefore, the realization of an overglazing.

One can realize embodiments of the panel following the invention by carrying out the following steps:

one disposes a cold sheet of thermally-tempered glass on a template which has a curving surface having a curvature formed therein that is substantially identical to the curvature desired for the sheet of glass;

one applies on the parts of the sheet of glass which are not in contact with the curving surface of the template, a force sufficient for imparting to this sheet a curvature substantially corresponding to that of the curving surface template, this operation being carried out at a temperature less than 140° C.;

one puts in place, on each of the two curved edges of the sheet of glass, a respective curved frame section having a longitudinal slot formed therein, in which one inserts one of the curved edges of the sheet of glass;

one puts in place, on each of the two straight edges of the sheet of glass, a respective straight section having a longitudinal slot formed therein, in which one inserts one of the straight edges of the sheet of glass;

one assembles by their extremities (opposite ends), the curved frame sections and the straight frame sections, in a manner to form a complete frame, such that the curvature of the thermally-tempered, cold-curved sheet of glass is maintained under constraint;

one then eliminates the forces which have permitted cold-curving of the sheet of glass; and one lifts the cold-curved, framed glazed panel from the template.

Following the above embodiment, one may also obtain the thermally-tempered, cold sheet of glass by:

thermally-tempering a sheet of glass, whereby a thermally-tempered sheet of glass is produced; and cooling the thermally-tempered sheet of glass, to a temperature being less than 140° C.

Following a form of realization of this method, the curving surface of the template may, be a concave surface in the form of a cylindrical arc.

Following another embodiment of this method, the curving surface of the template may, alternatively be convex surface in the form of a cylindrical arc.

Following one of the embodiments of these methods, the sheet of glass is a simple thermally-tempered sheet of glass, and the operation of curving is carried out at ambient temperature.

Following another embodiment of these methods, the sheet of glass is a laminated sheet of glass formed from two sheets of thermally-tempered glass joined by an intermediate layer of adhesive transparent plastic-like material. In this case, the operation of curving is effectuated at a temperature sufficient for provoking a softening of the plastic-like material (without softening the sheets of glass) during the operation of curving.

Following a particular embodiment of this method, the plastic-like material is polyvinyl butyral, the operation of curving being carried out at a temperature of more than 80° C. and less than 140° C. Alternatively, the sheet of glass is equally may also contain other plastic-like material, such as polyurethane and polycarbonate, having a similar mechanical effect.

The use of panels of thermally-tempered glass, cold-curved according to the invention, enables the realization of large resistant glazed surfaces which are very luminous, decorative and which are of relatively light weight. This, in turn, permits the structures of support, the frameworks, the frame body, the frames and the panels to be able to be lightened.

The conception and the modular construction enables the assembling of frames of tall construction, which favorably influences the cost of realization of a glazed wall.

The curved glazed panel is constructed according to a method which is very simple and very safe, so that it is possible to realize their production, even by unskilled labor, in decentralized workshops, and even on the same site as the construction of the structure.

Due to the simplicity of the panels, these workshops are able to be supplied with the raw materials, that is to say, essentially flat glass and the frame sections, by means of classical transport.

In case of accidental breakage, the tempered glass in particular, decomposes itself into a multitude of fragments which do not cut, and which represent a very low risk of injury for persons.

If one desires again to increase the level of security, for example, when persons are permanently in relatively close proximity to the panels, one is able to employ, without problem a laminated sheet with which the risk of injury by cutting is practically nonexistent.

As a function of the imperatives attached to the security of persons one is perfectly able, in certain usages, to utilize the overglazing panels in which a first sheet is ordinary thermally-tempered glass, and in which the second sheet is placed parallel to the glass on the side of the wall oriented towards a public passage, this second sheet being laminated glass.

One can use without problem, for the realization of these curved glazed panels, glass whose thickness varies between 2 and 6 mm. One will note that the term "thermally-tempered glass" must, in the sense of the patent, be use according to its generally accepted meaning, which includes thermally tempered glass as well as the thermally "hardened" glass.

Other particulars, advantages and characteristics of the invention, will become apparent from the description of particular executions hereafter given, in conjunction with reference to the annexed figures.

BRIEF DESCRIPTION OF THE DRAWINGS

FIG. 2 is a schematic view, in perspective, of a device of the present invention for performing the cold-curving of the sheet of glass, having a curving surface having a sheet of thermally-tempered glass disposed thereon.

BRIEF DESCRIPTION OF PREFERRED EMBODIMENTS

Figure 1:
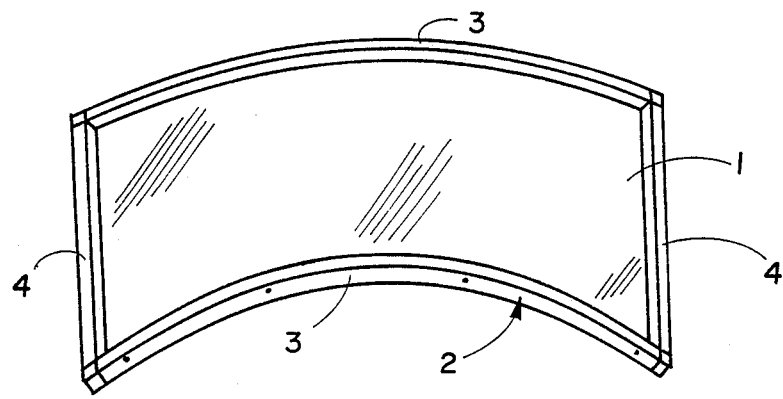
FIG. 1 is a view, in perspective, of the cold-curved, thermally-tempered glazed panel of the present invention.

The FIG. 1 is a perspective view, of the panel of cold-curved glass according to the invention.

A sheet of cold-curved, thermally-tempered glass 1 is provided having a resiliently-flexed curvature formed therein which is maintained under constraint by a frame 2 that is secured to the edges of the sheet of glass 1. This frame 2 is composed of a pair of substantially parallel curved frame sections 3 and a pair of substantially parallel straight frame sections 4.

FIG. 2 is a schematic view, in perspective, of a device for the cold-curving of the cold sheets of glass having a sheet of thermally-tempered glass disposed thereon in the course of curving.

The table includes a template having curved deck (curving surface) 5 which is covered with a flexible glued material 6. The surface of the deck 5 corresponds to the surface of a segment of a cylindrical arc and may, alternatively be either convex (FIG. 2) or concave in shape. The dimensions of the deck 5 are slightly smaller than those of the sheet 1 to be curved.

The sheet 1 to be curved is secured by a suction portion of the suction discs 7 carried on a movable portion of jacks 8, (which may be pneumatic or hydraulic) for concomitant movement therewith between a first retracted position and a second extended position. The traction exercised by these jacks 8 entrains the progressive curvature of the sheet of glass which comes to apply itself on the deck 5. The openings 9 formed in the surface of the curving surface 5 permits the progressive retraction of the suction discs 7 into the second retracted position, so that they are flush with the curving surface 5. The curving surface 5 of the curving table (template) is supported by a plurality of legs which are secured thereto, extending downwardly therefrom. Brace 10 is positioned between opposed portions of the template curving surface being intended for absorbing a portion of the force generated on the surface during curving. The sheet of glass 1 is thus maintained in place by the suction discs 7 while one adjusts (assembles) on each of the curved edges of the sheet of glass the first and second elements of a curved frame section 3 of corresponding form.

The edges of the sheet of glass are maintained in the longitudinal slots 11 formed in the curved sections 3. One then adjusts the first and second elements of the straight frame sections 4, which, preferably, are already assembled to the corner frame sections 12, on the rectilinear sides of the sheet of glass 1. The corner frame sections 12 firmly secure the extremities (opposed ends) of the straight frame sections 4 and the curved frame sections 3.

Preferably, each of the longitudinal slots 11 are formed by the joining of a first frame element and a second frame element. Each of the straight and curved frame sections have a first element including a longitudinal rabbet. Each of the rabbets is adapted to receive a respective edge of the sheet of glass. Each of the curved and straight frame sections further include a second frame element secured to the first-frame element over the rabbet, partially enclosing the rabbet and forming the longitudinal slot 11.

One is able at this moment to release the suction discs 7, from the sheet of glass 1, the force generated by the maintenance of the resiliently-flexed curvature of the sheet of thermally-tempered glass being whenceforth taken by the assembled frame 2.

Curved, a sheet of thermally-tempered glass is visibly more rigid than planar because of the increase of its moment of inertia.

It should be noted that the glass in the form of a thin annealed sheet is relatively fragile and is not able to undergo such cold-curving, except that curving which is performed for a very large radius of curvature, its constraint of rupture to the forces of traction being in the order of 50N/M$^2$ or more.

However in practice, after curving, the constraint of extension of the convex side of the sheet of curved glass in the conditions of use proposed, must be visibly less than the preconstraints of compression due to the thermal tempering of the glass, which permits secure working and which permits the obtaining of a wall corresponding to the norms of security in force. One therefore obtains a better resistance to impact as is able to be seen in referring to the table below:

| Glass | | | | |
|---|---|---|---|---|
| Dimensions mm | Thickness mm | Thermal Treatment | Radius Of Forced Curvature | Resistance To Impact (Joules) |
| 997 × 1650 | 3.8 | annealed | plan | 13 |
| 2000 × 3210 | 3.8 | tempered | 4.8 | 25 |
| 2000 × 3210 | 3.8 | tempered | 9.6 | 27 |
| 2000 × 3210 | 4.8 | tempered | 9.6 | 34 |

For the appreciation of this table, it should be borne in mind that hail is able to attain a kinetic energy of 20 joules.

The technique of construction proposed is simple, using a simple device for construction of the panels. The force of curving can also be applied on the sheet not by traction, but by pressure.

In the case of a laminated thermally-tempered sheet of glass, the technique of placing the glass in the form described above includes a supplemental step, involving a preheating of the sheet of glass between 80° C. and 140° C., a temperature which is sufficient for bringing about a softening of the sheet of plastic-like material therebetween, but is nonetheless well less than that which is necessary to soften the glass. In spite of this preheating, one remains, therefore, well within a technique of "cold-curving".

Figure 3:
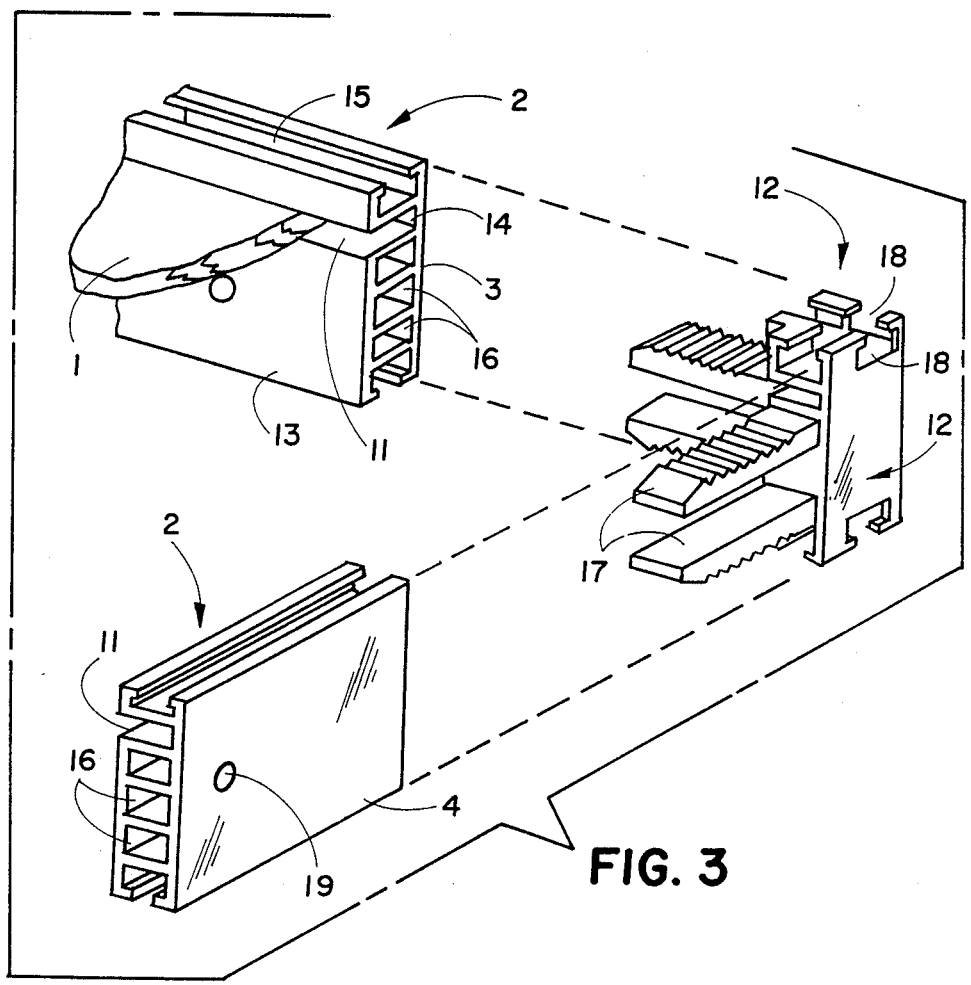
FIG. 3 is an exploded view, with parts broken away, of a corner of a panel according to the invention.

FIG. 3 is a view in perspective, partially broken away, of a corner of the frame 2 of a curved sheet of thermally-tempered glass according to the invention. The sheet of glass 1 is inserted in the contiguous slot 11 formed on the internal face 13 of the frame 2 by the longitudinal slots of the frame sections when the frame sections 3 and 4 (and corner sections 12) are assembled. A ribbon 14 of flexible material or of glue is placed in this slot 11 which improves the tightness and the mechanical qualities of the glass-metal (glass-frame) junction. The upper and lower inverted T-slots 15 are each formed in one (or both) of the exterior or interior sides and open, respectively, towards the top and the bottom. Each inverted T-slot 15 runs along the frame sections 3 and 4 on each of their faces (the interior or exterior sides) which are parallel to the sheet of glass 1. The channels 16 are formed in the opposite ends of the sections 3 and 4 and extend at least partially therethrough.

Each corner frame section 12 is secured to two respective frame sections 3 and 4. Each corner frame section is equipped, on a one and a second portion thereof, with at least one respective outwardly-extending anchoring tongue 17, whose form corresponds to that of the channels 16 of the sections 3 and 4. Preferably, both the anchoring tongues 17 and the channels 16 each have a plurality of ribs, such that the ribs of the tongues 17 enter into the channels 16 aiding in firmly securing the frame sections into a contiguous frame. The corner frame sections 12 are each further equipped with a pair of perpendicular, longitudinal slots formed therein which intersect one another forming a right angle therebetween. The exterior and interior sides of each of the corner frame sections are further equipped with a pair of longitudinal anchoring slots which are perpendicular to, and intersect each other forming a right angle therebetween. These anchoring slots 18 are aligned with anchoring slots 15 of each frame section 3 and 4, in such a way that these slots 15 open onto the external and internal sides of the frame 2. The anchoring tongues 17 are inserted in the channels 16 of both the straight frame sections 4 and the curved frame sections 3, which have the edges of the sheet of glass disposed therein.

Tapped apertures 19 are formed through the lateral side walls of the frame permitting the insertion of threaded bolts 20 (see FIG. 4), thereby serving to secure two contiguous panels to one another or to fix a panel to a support structure.

Figure 4:
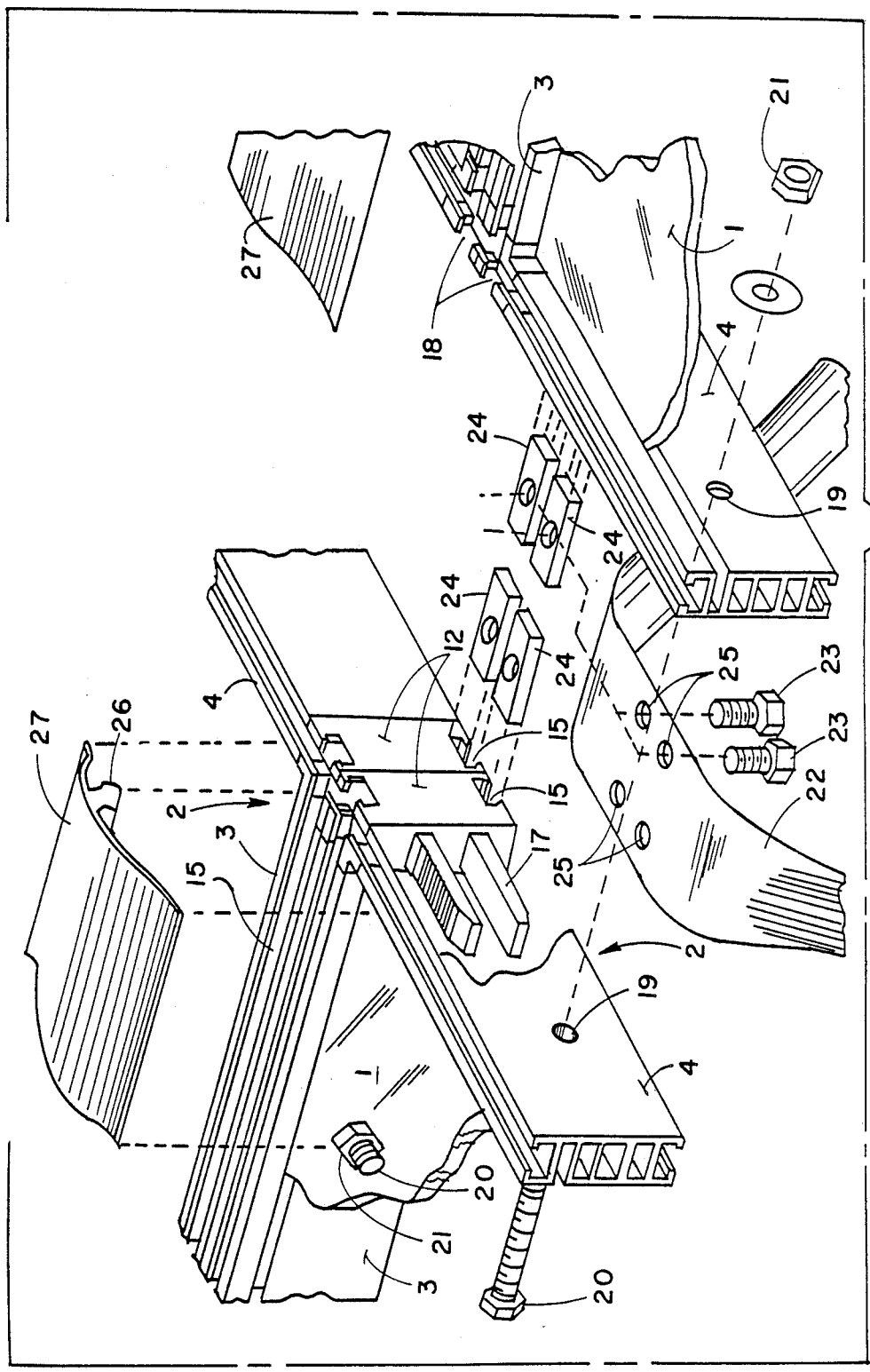
FIG. 4 is an exploded view, with parts broken away, of an assembly four panels according to the invention.

FIG. 4 is an exploded view, partially broken away, of an assembly joint of four curved glazed panels of the type represented in FIGS. 1 and 3.

The panels are represented joined two by two by means of threaded bolts 20 and tapped nuts 21 which join the juxtaposed sections 3 of each pair of panels.

The four panels are able to be fixed on a support structure 22, by means of a clip including a bolt shaft portion (screw) 23 having enlarged head portions (rectangular nuts) 24 carried on both of the opposite ends of the shaft portion 23. The enlarged head portions 24 are inserted into the lower inverted T-slots 15 running along the exterior or interior sides of the sections 3. The bolt shaft portion 23 passes through the holes 25 formed in the support structure 22 and engages itself in the enlarged head portions 24, fixing thereby the panels on this support structure 22. Alternatively, both of the head portions 24 may be received in respective T-slots of respective parallel panels, securing the two panels, substantially parallel to one another. The elongated form of the head portions 24 disperses (spreads) the stress avoiding a localized deformation of the sides of the lower inverted T-slot 15.

The juxtaposed sections 4 are able to equally be secured between them by means of threaded bolts 20 (passing through the tapped holes 19) and of the nuts 21.

On the upper face of the panels, the inverted T-slots 15 open towards the top, permitting the removable insertion of a downwardly-extending anchoring extension 26 of a flexible watertight section 27. Section 27 has a pair of downwardly-extending sloped portions which covers (overlies) the joint between two adjacent panels and which contacts the surface of the glass sheet forming a substantially watertight seal therebetween. This seal substantially prevents the entry of water between adjacent panels and between the sheet of glass and the frame section.

Figure 5:
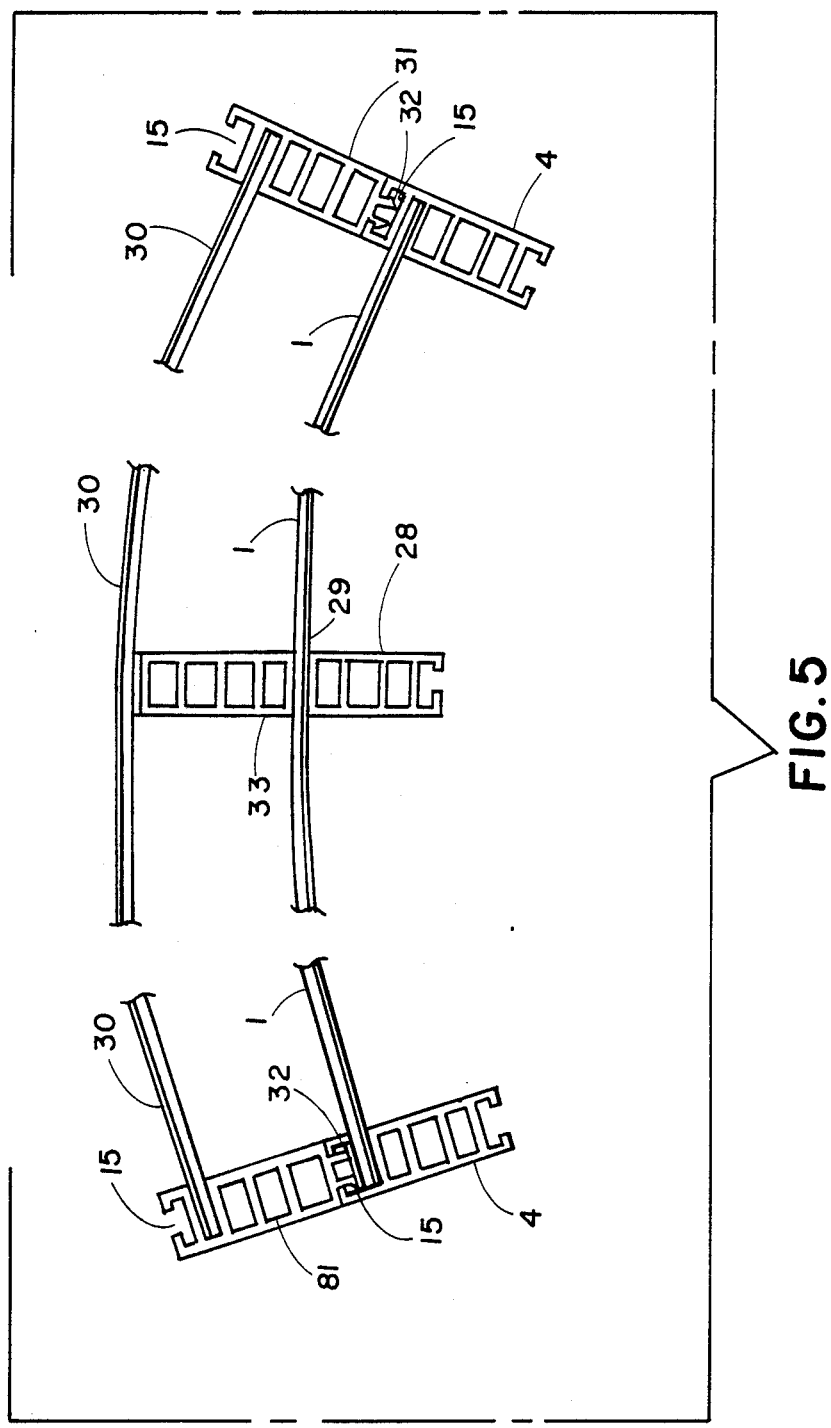
FIG. 5 is a cross-section view with interruption, along a plan parallel to of the curved sides of a cold-curved, thermally-tempered, glazed panel including a supplemental traverse frame section and an overglazing.

The FIG. 5 is a view in cut along a plan parallel of the curved sides of a curved glazed panel comprising together the supplemental traverse frame section and an overglazing. The supplemental traverse frame section 28 is disposed on the middle of the sheet of glass 1 and is fixed, by each of its extremities, to one of the curved frame sections 3.

The supplemental traverse frame section 28, runs along, over all its length, the concave face of the sheet of glass 1 and supports it.

In the embodiment of FIG. 5, the supplemental traverse frame section 28 is maintained by a ribbon of glue 29.

The overglazing 30 is maintained in curved form by a frame 31. The sections constituting this frame 31 are comprised, on one of their small sides, of the clip 32 whose profile is able to interlock itself in the upper inverted T-slot 15 of the frame sections 3 and 4 of the first panel.

The frames 2 and 31 of the two panels are able therefore to adjust themselves the one on the other, forming an ensemble which is able to be constructed in one piece. A second supplemental traverse frame section 33 may also be disposed between the sheets of glass 1 and 30.

Figure 6:
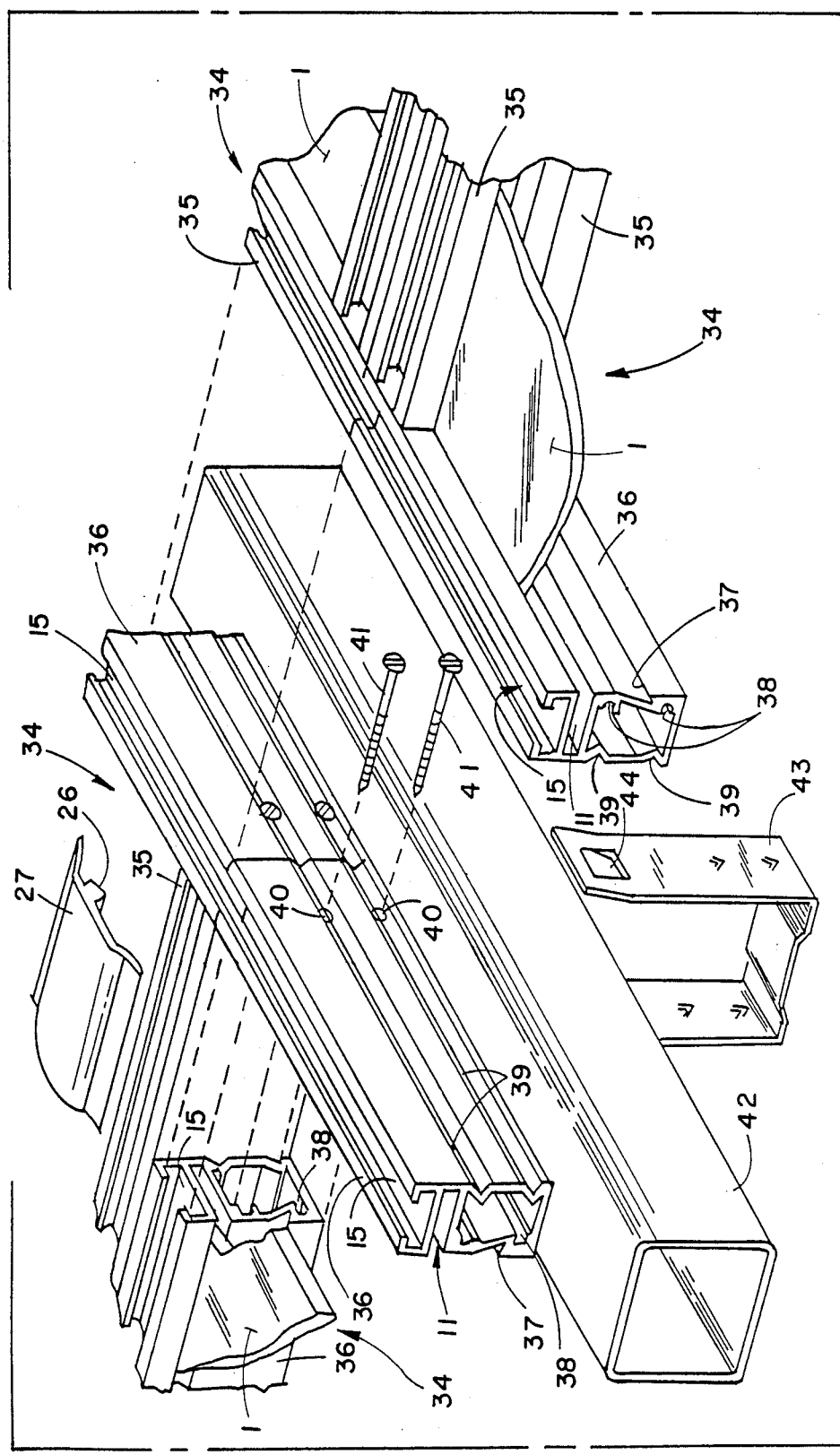
FIG. 6 is an exploded view, with parts broken away, of an assembly joint of four panels realized following another mode of execution of the invention.

The FIG. 6 shows another embodiment of a curved glazed panel according to the invention. It concerns an exploded view, partially broken away, of another mode of execution of one assembly joint of four curved glass panels following this form of execution and the fixation of these panels on an element of the framework of support.

In this form of execution, a curved glazed panel 34 includes a sheet of thermally-tempered glass 1. This sheet of glass is elastically-flexed having a curvature therein. The edges of the sheet of glass is inserted in a longitudinal slot 11 formed on the internal face of a frame formed by the assembly of two curved frame sections 36 and two straight frame sections 35 which present the same transverse section.

The upper part of the frame sections 35 and 36 are identical to those of frame sections 3 and 4 described above and presents therefore a longitudinal inverted T-slot 15 open towards the top. The lateral side wall of the frame sections 35 and 36, which is turned towards the interior of the frame (the exterior face), presents a longitudinal slot 11 in which is engaged (inserted) the edge of the sheet of glass 1.

Below the longitudinal slot 11, each of the frame sections 35 and 36 are hollow having a transverse cross-section of the general character of a rectangle.

The exterior face of one of the lateral side walls which is disposed towards the interior of the frame (towards the glass) presents, a groove 37 whose lower face forms a sharp angle (edge of anchoring) with the part of this wall which is situated under this groove 37. In the interior face of this frame section, this same internal side wall presents two pairs of ribs. Each pair of ribs defines a small split cylindrical tubular sheath 38.

The other lateral side wall of the section, on the exterior face of the frame presents two grooves 39. The bottoms of these grooves 39 extend, respectively, on the same level as the axes of the split cylindrical tubular sheaths 38.

FIG. 6 shows how these frame sections 35 and 36 are assembled to one another to form the frames of the curved glazed panels 34. The tapped holes 40, situated at the level of the bottom of these grooves 39, traverse the two lateral side walls of the sections 36 in the proximity of their opposite ends. The threaded screws 41 pass through the holes 40 and engage are securely received in the small split cylindrical tubular sheaths 38 of the frame sections 35, securing thereby the opposite ends of a frame section 36 with the opposite end of another frame section 35 to which it abuts. The heads of screws 41 are engaged in the grooves 39.

The FIG. 6 shows equally how the curved glazed panels 34 are able to be assembled between them and are fixed on the elements of support 42 (which are, for example, the elements constituting a framework of a glasshouse or of a greenhouse).

Two sections 36, placed back to back, are fixed on a support element 42 and the ensemble of these pieces are maintained in place by U-clips 43. Each of the vertical branches of a clip 43 has, close to its free extremity, an elastic pin (lug) 44 which, when the clip 43 is placed in place, is engaged in the groove 37 of a section 35 or 36. These clips 43 permit thereby to assemble between them the juxtaposed curved glazed panels 34, fixing them simultaneously on a framework of support (formed of support elements 42).

On the top (exterior) face of the exterior side wall of each of the frame sections of the panels 34, the inverted T-slots open towards the top, permitting the insertion therein of the downwardly-extending anchoring extension 26 of a flexible watertight section 27 which, by downwardly-extending sloped portions, covers the junction between two juxtaposed panels 34 in the same manner as the watertight sections described above.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A curved glazed panel, comprising:
   a thermally-tempered, cold-curved-sheet of glass having a resiliently-flexed curvature formed therein; and
   a frame secured to the sheet of glass and maintaining the resiliently-flexed curvature of the glass under constraint.

2. The curved glazed panel of claim 1, wherein the sheet of glass is laminated.

3. A curved glazed panel, comprising:
   a thermally-tempered, cold-curved sheet of glass having a resiliently-flexed curvature formed therein and further having a pair of substantially parallel curved edges and a pair of substantially parallel straight edges;
   a frame being a curved frame disposed about the edges of the curved sheet of glass and adapted to maintain the resiliently-flexed curvature of the sheet of glass under constraint, said curved frame having a pair of substantially parallel curved frame sections including a pair of opposite ends and a pair of substantially parallel straight frame sections including a pair of opposite ends, each of the straight frame sections and each of the said curved frame sections having a longitudinal slot formed therein, each of the straight frame sections disposed along a respective straight edge of the sheet of glass having the edge of the sheet of glass received and retained in the slot formed therein, and each of the curved frame sections being disposed along a respective curved edge of the sheet of glass having the edge of the sheet of glass received and retained in the slot formed therein; and
   means for securing the opposite ends of each straight frame section to a respective opposite end of a curved frame section and maintaining the curvature of the glass under constraint, whereby the curved glazed panel is formed.

4. The curved glazed panel of claim 3, wherein the means for securing the opposite ends of each straight frame section to an opposite end of a curved frame section is comprised of:
   a plurality of corner frame sections, each said corner frame section being positioned between and, on one portion thereof, abutting an opposite end of a curved frame section and, on a second portion thereof, abutting an opposite end of a straight frame section; and
   means for securing each of the corner frame sections to the opposite ends of the respective straight and curved frame sections which each of the respective corner frame sections abut, such that the curved and straight frame sections are secured substantially at right angles to each other.

5. The curved glazed panel of claim 4, wherein the means for securing each of the corner frame sections to the respective opposite ends of the straight and curved frame sections which each of the respective corner frame sections abut, is comprised of:
   each corner section having a pair of anchoring tongues formed thereon and extending outwardly therefrom, one of the anchoring tongues of each corner section being formed on the one portion of the corner section and the other anchoring tongue being formed on the second portion thereof; and
   each of the opposite ends of each of the curved and straight frame sections having a channel formed at least partially therethrough, such that each of the anchoring tongues of each corner frame section are received in a respective channel, removably securing the corner frame sections thereto, forming a contiguous frame and retaining the curvature of the sheet of glass under constraint.

6. The curved glazed panel of claim 5, wherein the means for securing each of the corner frame sections to the opposite ends of the straight and curved frame sections which the corner frame section abuts, is comprised of:
   each of the anchoring tongues having a plurality of ribs formed thereon and extending outwardly therefrom.

7. The curved glazed panel of claim 4, further comprised of:
   each of the corner frame sections further having a pair of longitudinal slots formed therein, each of the slots on each of the respective corner frame sections being perpendicular to the other of said slots, intersecting one another and forming a right angle therebetween; and
   each of the slots of the corner frame sections receiving therein at least a portion of a respective edge of one of the edges of the sheet of glass.

8. The curved glazed panel of claim 4, further comprising:
   each of the curved, straight and corner frame sections further having an exterior side and an interior side;
   one of said exterior or interior sides of each of the curved and straight frame sections having a longitudinal anchoring slot formed therethrough; and
   the same exterior or interior sides of each of the corner frame sections having a pair of longitudinal anchoring slots formed therethrough, each of said longitudinal anchoring slots being perpendicular to each other, intersecting each other and forming a right angle therebetween.

9. The curved glazed panel of claim 8, wherein all of the longitudinal anchoring slots in the one of the interior or exterior sides of the straight, curved and corner frame sections are in the form of inverted T-slots.

10. The curved glazed panel of claim 8, further comprising:
    the other of the said exterior or interior sides of each of the curved and straight frame sections having a longitudinal anchoring slot formed therethrough; and
    the same said other exterior or interior sides of each of the corner frame sections having a pair of longitudinal anchoring slots formed therethrough, each of said longitudinal anchoring slots being perpendicular to each other, intersecting each other and forming a right angle therebetween.

11. The curved glazed panel of claim 10, wherein all of the longitudinal anchoring slots in the one and in the other interior and exterior sides of the straight, curved and corner frame sections are in the form of inverted T-slots.

12. The curved glazed panel of claim 9, further comprised of:
    at least one anchoring clip, each clip having a bolt shaft portion including a pair of opposite ends, each clip further having an enlarged head portion carried on both of the opposite ends of the shaft portion, wherein each of the head portions of each clip is removably received in a respective longitudinal anchoring slot formed in one of either the interior or exterior sides of either the straight, curved and corner frame sections of two different panels, securing the two panels to one another on substantially parallel planes.

13. The curved glazed panel of claim 8, further comprised of:
    at least one flexible watertight section having a downwardly-extending anchoring extension, said anchoring extension being sized to be received in a respective longitudinal anchoring slot formed in one of the frame sections of a respective panel, the flexible watertight section having a pair of downwardly-extending sloped portions, wherein when the watertight section is received in the said anchoring slot, one of the sloped portions overlies the frame section, contacting the glass sheet of the said glazed panel and forming a substantially watertight seal therebetween, substantially preventing the entry of water between adjacent panels and between the sheet of glass and the frame section which the watertight section is secured thereto.

14. The curved glazed panel of claim 3, wherein each of the straight and curved frame sections have a tapped aperture formed therethrough, each of said apertures positioned on an axis being perpendicular to the longitudinal slot, whereby when aligned with a respective tapped aperture formed in a frame section of another panel, a threaded bolt may be received through the two aligned apertures, securing the panels to each other in a side-by-side arrangement.

15. The curved glazed panel of claim 3, wherein the longitudinal slots are comprised of:
    each of the straight and curved frame sections including a first frame element having a longitudinal rabbet formed therein, each of said rabbets being adapted to receive the edges of the sheet of glass; and
    each of the straight and curved frame sections further including a second frame element secured to the first frame element over the rabbet, partially enclosing the rabbet and forming the slot in each of the frame sections in which the edges of the sheet of glass are received and retained.

16. The curved glazed panel of claim 1, further comprised of:
    the thermally-tempered, cold-curved sheet of glass having the resiliently-flexed curvature formed therein, further having a pair of substantially parallel curved edges and a pair of substantially parallel straight edges;
    the frame being a curved frame disposed about the edges of the curved sheet of glass and adapted to maintain the resiliently-flexed curvature of the sheet of glass under constraint, said curved frame having a pair of substantially parallel curved frame sections including a pair of opposite ends and a pair of substantially parallel straight frame sections including a pair of opposite ends, each of the straight frame sections disposed along a respective straight edge of the sheet of glass and each of the curved frame sections being disposed along a respective curved edge of the sheet of glass, the opposite ends of each straight frame section positioned abutting a respective opposite end of a curved frame section;
    means for securing each frame section to the edge of the sheet of glass along which the respective frame sections are disposed; and
    means for securing each of the opposite ends of each of the straight frame sections to a respective opposite end of a respective curved frame section and maintaining the resiliently-flexed curvature of the sheet of glass under constraint, whereby the curved glazed panel is formed.

17. The curved glazed panel of claim 16, wherein the means for securing each frame section to the edge of the sheet of glass along which the respective frame section is disposed, is comprised of:
    each of the straight frame sections and each of the curved frame sections having a respective longitudinal slot formed therein, each of the straight frame sections receiving and retaining in the longitudinal slot thereof the straight edge of the sheet of glass along which said straight frame section is disposed, and each of the curved frame sections receiving and retaining in the longitudinal slot thereof the curved edge of the sheet of glass along which said curved frame section is disposed.

18. The curved glazed panel of claim 17, wherein the slots are comprised of:
    each of the straight and curved frame sections including a first frame element having a longitudinal rabbet formed therein, each of said rabbets being adapted to receive the edges of the sheet of glass; and
    each of the straight and curved frame sections further including a second frame element secured to the first frame element over the rabbet, partially enclosing the rabbet and forming the longitudinal slot in each of the frame sections into which the edges of the sheet of glass are received.

19. The curved glazed panel of claim 17, further comprised of:
    each of the frame sections further being hollow, defining a pair of substantially parallel lateral side walls, each lateral side wall having an interior face and an exterior face, and said hollow frame section further defining an exterior side wall and an interior side wall, each of said interior and exterior side walls being substantially parallel to each other, and each of said interior and exterior side walls having an interior face and an exterior face;
    the longitudinal slot, wherein the respective edges of the sheet of glass are received and retained, being formed on the exterior face of one of the lateral side walls of each frame section; walls of each frame section further having a split cylindrical longitudinal sheath formed therein substantially parallel to the slot; and a plurality of fastening means disposed laterally through both lateral side walls of one frame section and being received and secured in the longitudinal sheath of the frame section abutting thereto, whereby the frame sections are secured to one another in abutting arrangement.

20. The curved glazed panel of claim 19, further comprised of:
   each frame section having at least one longitudinal groove formed therein on substantially the same horizontal plane as the longitudinal sheath; and
   wherein the fastening means is laterally disposed through the longitudinal groove and both of the lateral side walls of one of the frame sections and is received in the longitudinal sheath of the frame section positioned abutting thereto, whereby the frame sections are secured to one another in the abutting arrangement.

21. The curved glazed panel of claim 16, further comprising:
   each of the curved and straight frame sections further having an exterior side wall and an interior side wall; and
   one of said exterior or interior side walls of each of the curved and straight frame sections having a longitudinal anchoring slot formed therethrough.

22. The curved glazed panel of claim 21, wherein all of the longitudinal anchoring slots in the one of the interior or exterior side walls of the straight and curved frame sections are in the form of inverted T-slots.

23. The curved glazed panel of claim 21, further comprising:
   the other of the said exterior or interior side walls of each of the curved and straight frame sections having a longitudinal anchoring slot formed therethrough.

24. The curved glazed panel of claim 23, wherein all of the longitudinal anchoring slots in the one and the other interior and exterior side walls of the straight and curved frame sections are in the form of inverted T-slots.

25. The curved glazed panel of claim 24, further comprised of:
   at least one anchoring clip, each clip having a bolt shaft portion including a pair of opposite ends, each clip further having an enlarged head portion carried on both of the opposite ends of the shaft portion, wherein each of the head portions of each clip is removably received in a respective longitudinal anchoring slot formed in one of either the interior or exterior side walls of either the straight, curved and corner frame sections of two different panels, securing the two panels to one another on substantially parallel planes.

26. The curved glazed panel of claim 16, wherein each of the straight and curved frame sections have a tapped aperture formed therethrough, each of said apertures positioned on an axis being substantially perpendicular to the longitudinal slot, whereby when aligned with a respective tapped aperture formed in a frame section of another panel, a threaded bolt may be received through the two aligned apertures, securing the panels to each other in a side-by-side arrangement.

27. The curved glazed panel of claim 21, further comprised of:
   at least one flexible watertight section having a downwardly-extending anchoring extension, said anchoring extension being sized to be received in a respective longitudinal anchoring slot formed in one of the frame sections of a respective panel, the flexible watertight section having a pair of downwardly-extending sloped portions, wherein when the watertight section is received in the said anchoring slot, one of the sloped portions overlies the frame section, contacting the glass sheet of the said glazed panel and forming a substantially watertight seal therebetween, substantially preventing the entry of water between adjacent panels and between the sheet of glass and the frame section which the watertight section is secured thereto.

* * * * *